United States Patent
DeLano

(10) Patent No.: US 7,398,374 B2
(45) Date of Patent: Jul. 8, 2008

(54) MULTI-CLUSTER PROCESSOR FOR PROCESSING INSTRUCTIONS OF ONE OR MORE INSTRUCTION THREADS

(75) Inventor: Eric DeLano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 10/083,872

(22) Filed: Feb. 27, 2002

(65) Prior Publication Data

US 2003/0163669 A1 Aug. 28, 2003

(51) Int. Cl.
*G06F 9/30* (2006.01)
(52) U.S. Cl. .................................. 712/215; 712/206
(58) Field of Classification Search .................. 712/23, 712/24, 206, 215
See application file for complete search history.

(56) References Cited

U.S. PATENT DOCUMENTS

| | | | | | |
|---|---|---|---|---|---|
| 5,303,354 | A | * | 4/1994 | Higuchi et al. | 712/218 |
| 5,689,677 | A | * | 11/1997 | MacMillan | 711/106 |
| 5,729,761 | A | * | 3/1998 | Murata et al. | 710/14 |
| 5,903,771 | A | * | 5/1999 | Sgro et al. | 712/20 |
| 6,098,165 | A | * | 8/2000 | Panwar et al. | 712/215 |
| 6,151,668 | A | * | 11/2000 | Pechanek et al. | 712/24 |
| 6,269,437 | B1 | * | 7/2001 | Batten et al. | 712/28 |
| 6,272,616 | B1 | * | 8/2001 | Fernando et al. | 712/20 |
| 6,446,191 | B1 | * | 9/2002 | Pechanek et al. | 712/24 |
| 6,629,232 | B1 | * | 9/2003 | Arora et al. | 712/29 |
| 6,954,846 | B2 | * | 10/2005 | Leibholz et al. | 712/43 |
| 2003/0033509 | A1 | * | 2/2003 | Leibholz et al. | 712/228 |
| 2003/0093655 | A1 | * | 5/2003 | Gosior et al. | 712/228 |
| 2003/0135711 | A1 | * | 7/2003 | Shoemaker et al. | 712/200 |

FOREIGN PATENT DOCUMENTS

| | | |
|---|---|---|
| JP | 2000-029731 | 1/2000 |
| WO | WO 9924903 A1 * | 5/1999 |

OTHER PUBLICATIONS

InstantWeb. Free On-Line Dictionary of Computing (FOLDOC). http://www.instantweb.com/foldoc/foldoc.cgi?computer+dictionary search terms: latch and register.*
InstantWeb. "Online Computing Dictionary". © 1994-1999. Search Terms: VLIW; horizontal microcode; horizontal encoding; superscalar. http://www.instantweb.com/foldoc/foldoc. cgi?computer+dictionary.*
Intel. "Hyper-Threading Technology". Intel Technology Journal: vol. 06 Issue 01. © Feb. 14, 2002. pp. 1-66.*
Heuring, Vincent P. and Jordan, Harry F. "Computer Systems Design and Architecture". Reading, Mass.: Addison Wesley Longman, Inc., © 1997. pp. 151 and 534-535.*

* cited by examiner

*Primary Examiner*—Aimee J Li

(57) ABSTRACT

The invention provides a processor that processes bundles of instructions preferentially through clusters or execution units according to thread characteristics. The cluster architectures of the invention preferably include capability to process "multi-threaded" instructions. Selectively, the architecture either (a) processes singly-threaded instructions through a single cluster to avoid bypassing and to increase throughput, or (b) processes singly-threaded instructions through multiple processes to increase "per thread" performance. The architecture may be "configurable" to operate in one of two modes: in a "wide" mode of operation, the processor's internal clusters collectively process bundled instructions of one thread of a program at the same time; in a "throughput" mode of operation, those clusters independently process instruction bundles of separate program threads. Clusters are often implemented on a common die, with a core and register file per cluster.

11 Claims, 5 Drawing Sheets

MULTI-CLUSTER PROCESSOR FOR PROCESSING INSTRUCTIONS OF ONE OR MORE INSTRUCTION THREADS

BACKGROUND OF THE INVENTION

Certain VLSI processor architectures now group execution units as clusters to process bundled instructions. One "bundle" of instructions has three instructions; a cluster operates to process one bundle, or more, of instructions. FIG. 1 illustrates the prior art by showing a processor register file 10 coupled with clusters 12(1), 12(2) . . . 12(N). Each cluster 12 is a physical logic unit that includes multiple pipelines, with bypassing (e.g., as shown in FIG. 2), to parallel process the multiple instructions within the bundles. The advantages of clusters 12 lie primarily in timing efficiencies. Each cluster 12 more quickly processes one bundle as compared to two bundles; appropriate use of clusters may reduce bypassing requirements within processor architectures. However, a loss of performance is also realized in cluster-based architectures when information is shared between clusters, as at least one cycle latency results from moving data between them.

Certain VLSI processor architectures also use "multi-threading" techniques to process instructions through pipeline stages. FIG. 2 shows one exemplary multi-threading architecture 20 of the prior art. Architecture 20 illustratively has two program counters 22(1), 22(2), an instruction fetch unit 24, a multiplexer 26, a plurality of pipelines 28(1), 28(2) . . . 28(N), bypass logic 30, and register file 10. Multiple program counters 22 provide for the multiple program "threads" through pipelines 28; as any one instruction stalls, another instruction may proceed through pipelines 28 to increase collective instruction throughput. As known in the art, each counter 22 is a register that is written with the address of the next instruction at the end of each instruction fetch cycle in the pipeline; each pipeline 28 includes multiple execution stages such as fetch stage F, the decode stage D, the execute stage E, and the write-back stage W. Individual stages of pipelines 28 may transfer speculative data to other execution units through bypass logic 30 and multiplexer 26 to reduce data hazards in providing data forwarding capability for architecture 20. Register file 10 is typically written to, or "loaded," at the write-back stage W on logic lines 32.

The invention advances the state of the art in processing architectures incorporating logic such as shown in FIG. 1 and FIG. 2 by providing methods and systems for processing multi-thread instructions through clustered execution units. Several other features of the invention are apparent within the description that follows.

SUMMARY OF THE INVENTION

The invention of one aspect processes bundles of instructions preferentially through clusters such that bypassing is substantially maintained within a single cluster. Alternatively, in another aspect, the invention processes bundles of instructions preferentially through multiple clusters, with bypassing therebetween, to increase "per thread" performance. The cluster architectures of the invention thus preferably include capability to process "multi-threaded" instructions.

In one preferred aspect, the invention provides a "configurable" processor architecture that operates in one of two modes: in a "wide" mode of operation, the processor's internal clusters collectively process bundled instructions of one thread of a program at the same time; in a "throughput" mode of operation, those clusters independently process instruction bundles of separate program threads. Accordingly, the invention of this aspect provides advantages by flexibly operating with (a) a high degree of parallelism (i.e., in the "throughput" mode) or alternatively (b) a high degree of single threaded performance (i.e., in the "wide" mode). An independent user desiring maximum single thread performance can therefore select the wide mode preferentially; another user desiring to process many orders simultaneously, and in real-time (e.g., in a business such as an airline company), can therefore select the throughput mode preferentially.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
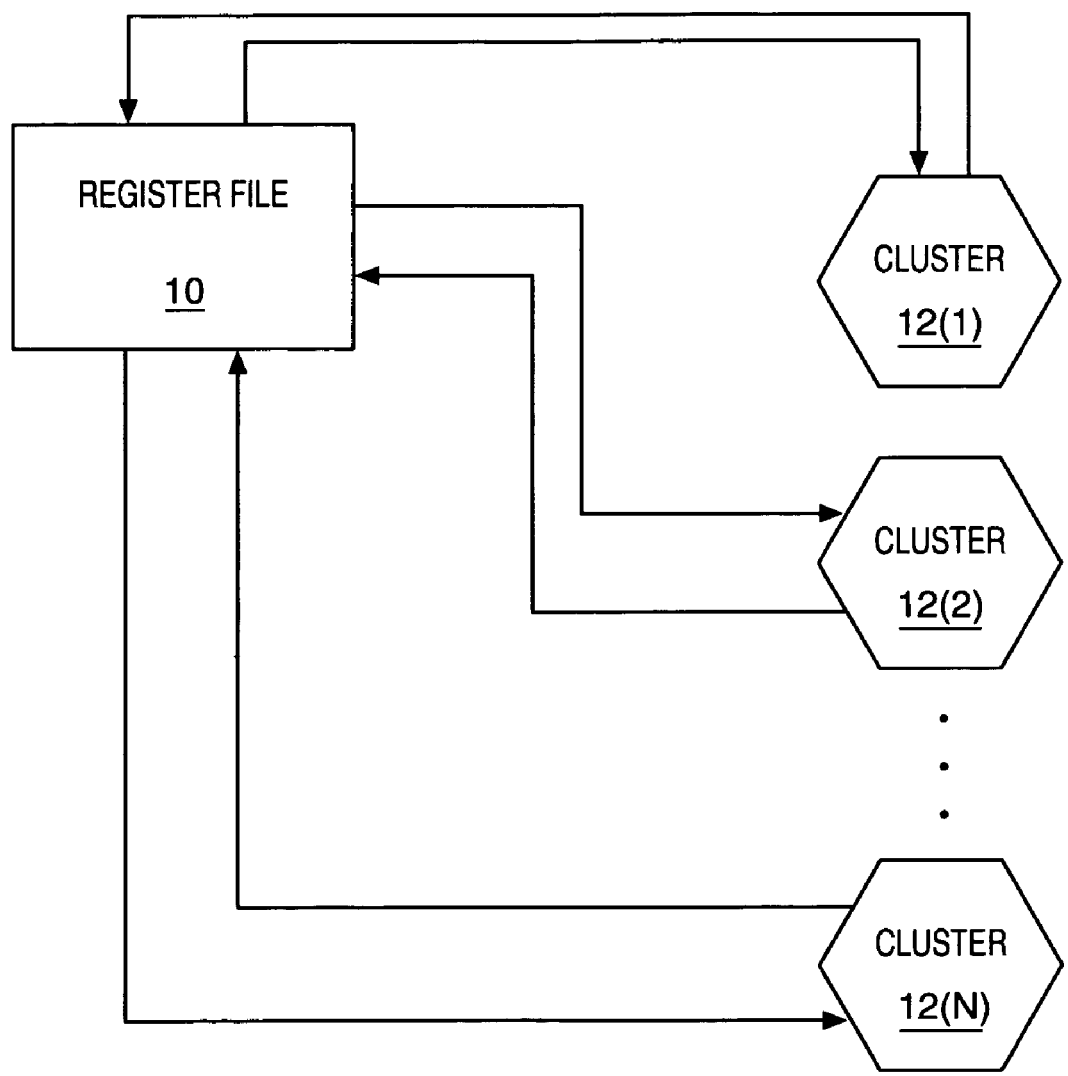
FIG. 1 illustrates cluster and register file logic for a prior art processor architecture.
Figure 2:
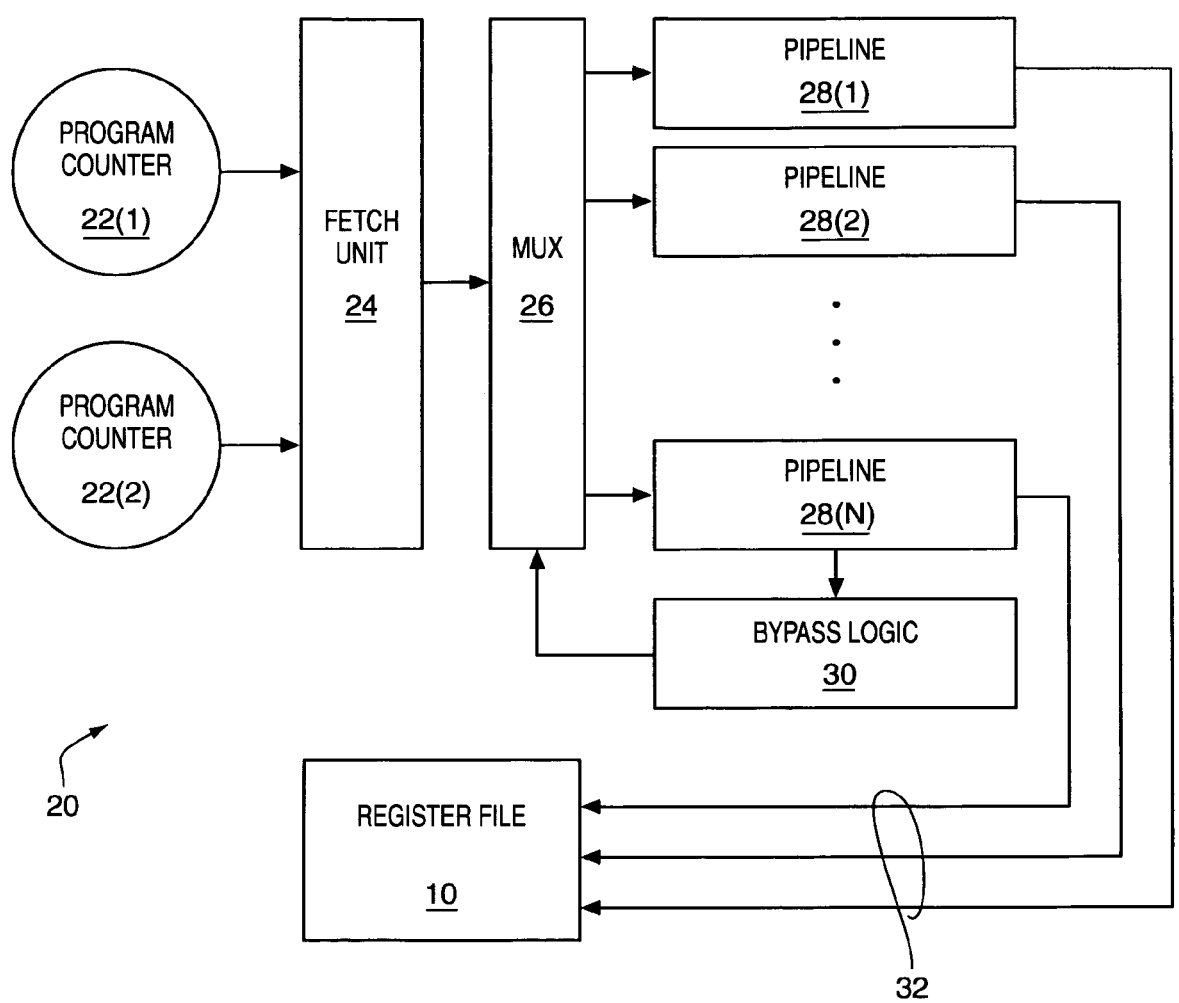
FIG. 2 illustrates pipeline stage processing of multiply-threaded instructions relative to the register file of FIG. 1.
Figure 3:
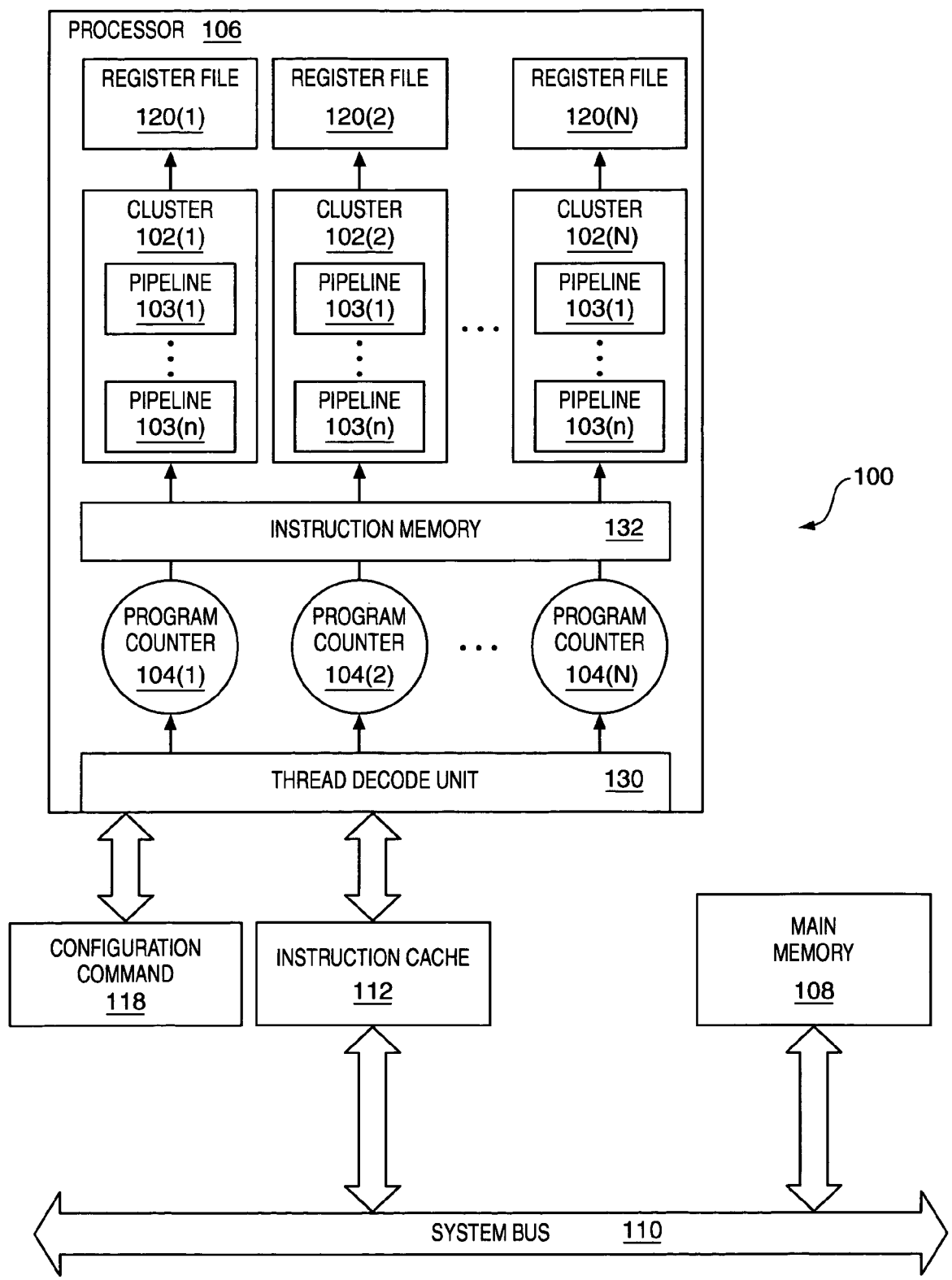
FIG. 3 schematically shows a multi-threaded cluster processing architecture of the invention.

FIG. 3 shows a processor architecture 100 of the invention. Architecture 100 utilizes multiple clusters 102 and program counters 104 to process instruction bundles relative to a singly- or multiply-threaded program control. Each cluster 102 is illustratively shown with multiple pipelines 103(1)-103(n), which operate to process bundled instructions. A processor 106 connects to a memory 108 by a system bus 110 that carries data and control signals between processor 106 and memory 108. Memory 108 may for example store instructions to be performed by processor 106. Instruction cache 112 stores these instructions, and other processor-generated instructions, for processing within processor 106. In the preferred embodiment of the invention, architecture 100 is configurable to operate in a wide mode of operation; alternatively, architecture 100 operates in a throughput mode of operation. Processor 106 is configured to operate in either mode by a user-selected configuration bit, for example communicated to processor 106 through a configuration command 118. Processor 106 has at least one register file 120; however, architecture 100 may include multiple register files 120(1)-120(N) to operate with each of clusters 102(1)-102(N) as a matter of design choice.

Program instructions are decoded in the thread decode unit 130. Depending on the configuration bit, decode unit 130 detects and then distributes bundled instructions to program counters 104 according to the threads associated with the instructions. If the configuration bit is set to wide mode, then bundled instructions from the same thread are processed through multiple clusters 102 at the same time. If the configuration bit is set to throughput mode, then bundled instructions from one thread are processed through one program counter 104, and through a corresponding cluster 102; bundled instructions from other threads are likewise processed through another program counter and cluster pair 104, 102.

An instruction memory 132 may optionally function to store bundled instructions, or to multiplex bundled instructions by and between different program counters 104 and different clusters 102, as a matter of design choice.

By way of example, in the throughput mode, three instructions from a single thread are bundled, by thread decode unit 130, and then processed through program counter and cluster 104(1), 102(1); three instructions from another thread are bundled, by thread decode unit 130, and processed through program counter and cluster 104(2), 102(2).

Each cluster 102 includes several pipelines and stage execution units so as to simultaneously perform, for example, F,D,E,W on multiple instructions within the bundle.

Figure 4:
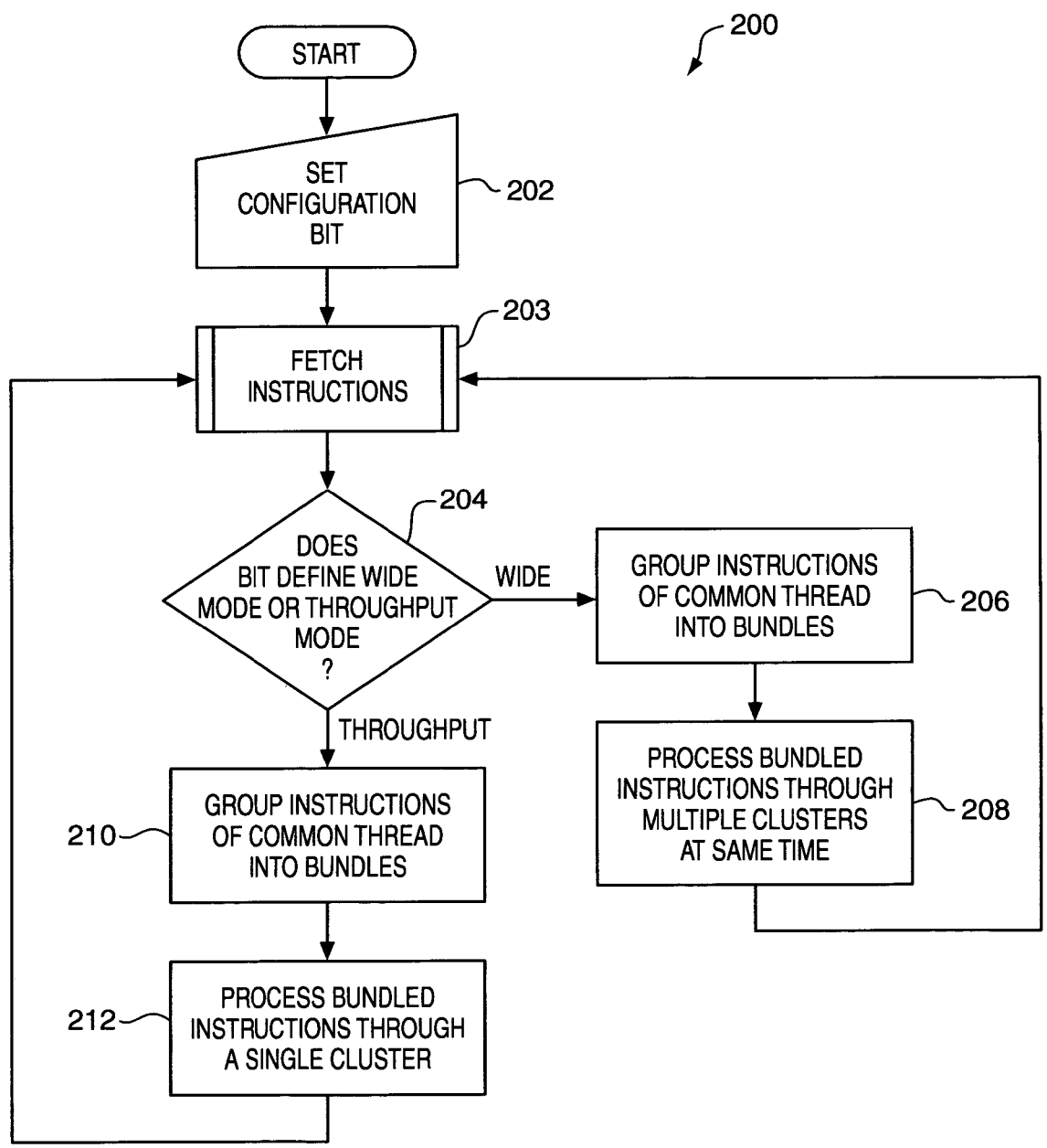
FIG. 4 shows a flowchart for processing bundled instructions through a CPU in accord with the invention.

FIG. 4 shows a flow chart 200 illustrating functional steps in processing bundled instructions through cluster architectures on one embodiment of the invention. At step 202, a configuration bit is set to command the CPU to process bundled instructions within the wide mode or throughput mode. Generally, step 202 is performed at the beginning of operations, according to user commands of a computing system. Alternatively, a cluster within the CPU may select the configuration bit depending upon the occurrence or non-occurrence of certain criteria. Instructions are cached at step 203; for example, at step 203, instructions may be fetched according to thread association. A branch occurs at step 204 depending on the configuration bit. In the wide mode, at step 206, instructions of a common thread are bundled; these bundled instructions are then processed through multiple clusters, at step 208, to enhance "per thread" processing performance. In the throughput mode, at step 210, instructions of a common thread are bundled; these bundled instructions are then processed through a single cluster, at step 212, to enhance multiple program instruction throughput through the CPU. After steps 208 or 212, the process is repeated at instruction fetch step 203, as shown, to process additional bundles through the CPU.

Figure 5:
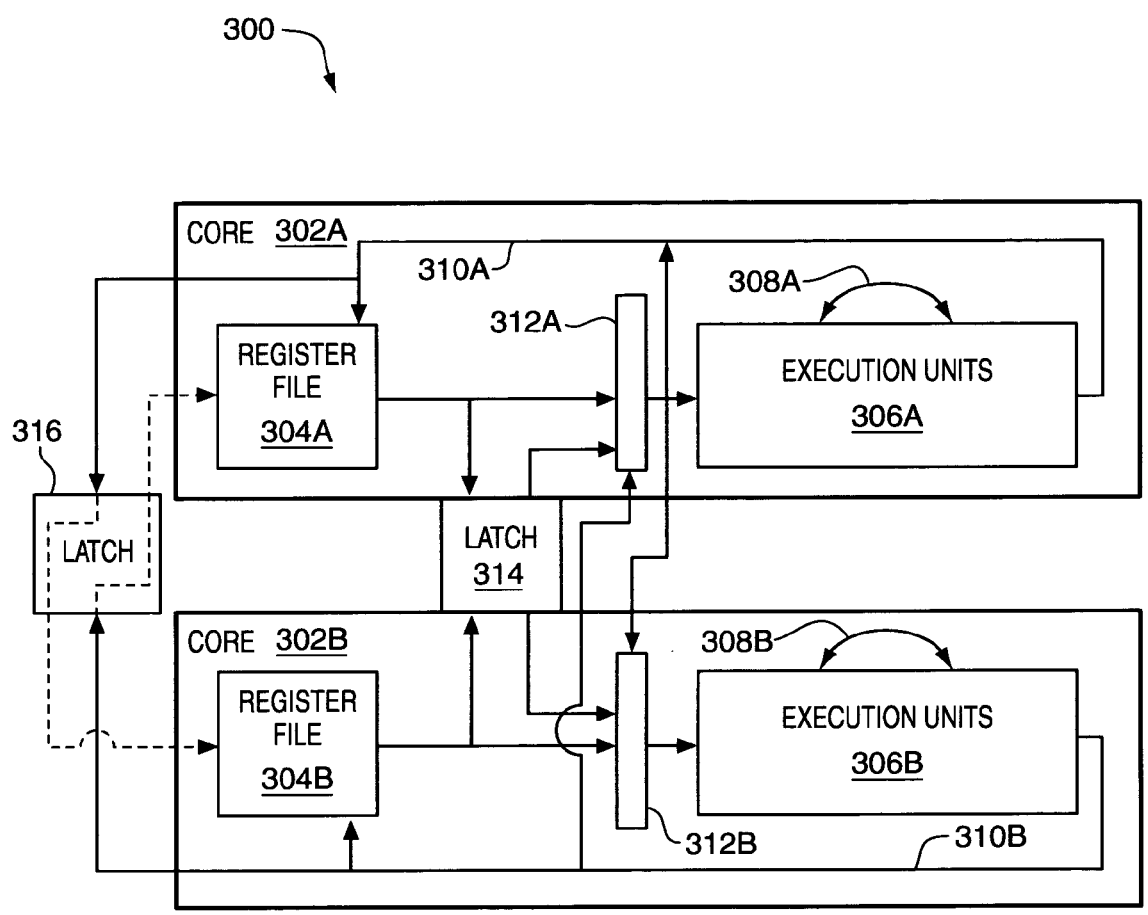
FIG. 5 shows a schematic diagram of one cluster architecture of the invention.

FIG. 5 illustrates a four-bundle cluster processor architecture 300 suitable for use with the invention. Architecture 300 includes two processing cores 302A and 302B. Each core 302 includes an associated register file 304 and pipeline execution units 306, as shown. Execution units 306 include internal bypassing capability, as indicated by arrows 308A, 308B. Cores 302A, 302B may be identical. Units 306A, 306B writeback to register file 304 by control lines 310A, 310B, respectively, If required, data transfer between cores 302 may occur via multiplexers 312A, 312B, as shown; a latch 314 may be used to couple data from one core 302 to the execution units 306 of the other core. Data from one core 302 that is architected to the register file 304 of the other core may be written, as shown, through a latch 316.

Each core 302 functions as a cluster, in accordance with the invention. In the wide mode, one thread may for example execute four bundles through both cores 302; inter-cluster communication occurs, with cycle delays, through multiplexers 312. In the wide mode, for example, core 302A may execute instructions corresponding to even program counter steps 0,2,4, etc.; and core 302B may execute instructions corresponding to odd program counters steps 1,3,5, etc. The cycle delays are eliminated through multiplexers 312 when architecture 300 operates in the throughput mode, as instruction bundles of common threads are only executed on a single core 302. The following illustrate how four bundles may be processed through architecture 300:

(1) 1 thread, 4 bundles, 2 clusters
(2) 1 thread, 2 bundles, 1 cluster; another thread, 2 bundles, other cluster
(3) 2 threads, 2 bundles, 1 cluster; 2 threads, 2 bundles, other cluster.

Note that (1) offers maximum parallelism in processing instructions, (3) offers maximum throughput of four separate threads, and (2) offers a mix between (1) and (3).

The invention thus attains the features set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for processing bundled instructions through execution units of a processor, comprising the steps of:
   determining a mode of operation, wherein the mode of operation comprises one of a throughput mode and a wide mode;
   in the throughput mode:
      fetching a first bundle of instructions from a first thread of a multiply-threaded program;
      distributing the first bundle to a first cluster of the execution units for execution therethrough;
      fetching a second bundle of instructions from a second thread of the program;
      distributing the second bundle to the first cluster of the execution units for execution therethrough;
      fetching a third bundle of instructions from a third thread of the program;
      distributing the third bundle to a second cluster of the execution units for execution therethrough;
      fetching a fourth bundle of instructions from a fourth thread of the program; and
      distributing the fourth bundle to the second cluster of the execution units for execution therethrough;
      wherein the first thread, the second thread, the third thread, and the fourth thread are executing simultaneously: and
   in the wide mode:
      fetching a fifth bundle of instructions from a fifth thread of the program;
      distributing the fifth bundle to only the first cluster for execution therethrough;
      fetching a sixth bundle of instructions from the fifth thread of the program; and
      distributing the sixth bundle to only the second cluster for execution therethrough.

2. The method of claim 1, further comprising:
   processing the first, second, and fifth bundles within the first cluster;
   processing the third, fourth, and sixth bundles within the second cluster.

3. The method of claim 1, further comprising a step of architecting data from the first cluster to a first register file.

4. The method of claim 1, further comprising a step of architecting data from the second cluster to a second register file.

5. The method of claim 1, the steps of fetching the first through sixth bundles each comprising decoding instructions into the first through sixth bundles, respectively.

6. The method of claim 1, further comprising:

bypassing data between the first cluster and the second cluster, as needed, to facilitate the processing of the fifth bundle through the first cluster and the sixth bundle through the second cluster.

7. The method of claim 6, wherein the step of bypassing the data utilizes a latch to couple the data between a register file of the first cluster and a register file of the second cluster.

8. The method of claim 1, wherein the step of determining the mode of operation comprises determining a state of a configuration bit.

9. A processor, comprising:

i. A first cluster and a second cluster, wherein each of the first cluster and the second cluster comprises a plurality of execution units, wherein each of the execution units is configured to process instructions;

ii. A configuration bit configured to specify a mode of operation, wherein the mode of operation comprises one of a throughput mode and a wide mode; and iii. A thread decoder configured to group instructions of a multiply-threaded program into singly-threaded bundles and to distribute the bundles to the first cluster and the second cluster according to a state of the configuration bit;

iv. Wherein during the throughput mode, the thread decoder is configured to distribute bundles of a first thread and a second thread to the first cluster for processing, and to distribute bundles of a third thread and a fourth thread to the second cluster for processing, wherein the first thread, the second thread, the third thread, and the fourth thread are executing simultaneously; and v. Wherein during the wide mode, the thread decoder is configured to distribute a first plurality of bundles of a fifth thread to only the first cluster for processing and a second plurality of bundles of the fifth thread to only the second cluster for processing.

10. The processor of claim 9, wherein each of the first cluster and the second cluster comprises a register file.

11. The processor of claim 10, further comprising a latch configured to bypass data between the register file of the first cluster and the register file of the second cluster, as needed, to facilitate the processing of the bundles of the fifth thread.

* * * * *

UNITED STATES PATENT AND TRADEMARK OFFICE
CERTIFICATE OF CORRECTION

PATENT NO. : 7,398,374 B2  Page 1 of 1
APPLICATION NO. : 10/083872
DATED : July 8, 2008
INVENTOR(S) : Eric DeLano It is certified that error appears in the above-identified patent and that said Letters Patent is hereby corrected as shown below:

In column 4, lines 43-44, in Claim 1, delete "simultaneously:" and insert
-- simultaneously; --, therefor.

Signed and Sealed this

Fourteenth Day of October, 2008

JON W. DUDAS
*Director of the United States Patent and Trademark Office*